US012809006B2

(12) United States Patent
Haverkamp

(10) Patent No.: US 12,809,006 B2
(45) Date of Patent: Nov. 24, 2026

(54) ULTRASONIC SENSOR FOR A MOTOR VEHICLE

(71) Applicant: Continental Autonomous Mobility Germany GmbH, Ingolstadt (DE)

(72) Inventor: Martin Haverkamp, Frankfurt am Main (DE)

(73) Assignee: Continental Autonomous Mobility Germany GmbH, Ingolstadt (DE)

( * ) Notice: Subject to any disclaimer, the term of this patent is extended or adjusted under 35 U.S.C. 154(b) by 0 days.

(21) Appl. No.: 18/854,811

(22) PCT Filed: Mar. 15, 2023

(86) PCT No.: PCT/DE2023/200059

§ 371 (c)(1),
(2) Date: Oct. 7, 2024

(87) PCT Pub. No.: WO2023/193851

PCT Pub. Date: Oct. 12, 2023

(65) Prior Publication Data

US 2025/0244457 A1 Jul. 31, 2025

(30) Foreign Application Priority Data

Apr. 5, 2022 (DE) ..................... 10 2022 203 361.2

(51) Int. Cl.
*G01S 7/521* (2006.01)
*G01S 15/931* (2020.01)

(52) U.S. Cl.
CPC ............ *G01S 7/521* (2013.01); *G01S 15/931* (2013.01)

(58) Field of Classification Search
CPC ............................... G01S 7/521; G01S 15/931
See application file for complete search history.

(56) References Cited

U.S. PATENT DOCUMENTS

2003/0089172 A1* 5/2003 Kupfernagel ........ G10K 11/002 73/632
2010/0296692 A1* 11/2010 Reiche .................. H04R 31/00 381/423
2016/0329037 A1* 11/2016 Wehling ................ G01S 15/931

FOREIGN PATENT DOCUMENTS

DE 102006028214 A1 12/2007
DE 102013022063 A1 6/2015
(Continued)

OTHER PUBLICATIONS

German Office Action dated Jan. 16, 2023 for the priority German Patent Application No. 10 2022 203 361.2 and machine translation of same.

(Continued)

*Primary Examiner* — Jason D Shanske
*Assistant Examiner* — Matthew James O'Neill
(74) *Attorney, Agent, or Firm* — Fitch, Even, Tabin & Flannery LLP

(57) ABSTRACT

An ultrasonic sensor is disclosed for a motor vehicle, having a sensor housing and having a pot-shaped membrane connected to the sensor housing. The membrane has a membrane base for emitting and/or receiving ultrasonic signals and a membrane wall adjoining the membrane base. A section of the membrane wall protrudes into the sensor housing. In a housing interior of a housing section of the sensor housing facing the membrane base, a first sealing compound is arranged, which fills the housing interior. The first sealing compounds extends at least partially into the membrane interior of the membrane (5) surrounded by the membrane wall, wherein the membrane is connected with a positive fit to the sensor housing by the first sealing compound.

9 Claims, 5 Drawing Sheets

(56) References Cited

FOREIGN PATENT DOCUMENTS

| | | | | |
|---|---|---|---|---|
| EP | 2816372 | A2 | 12/2014 | |
| EP | 2879128 | A1 | 6/2015 | |
| EP | 2684186 | B2 * | 7/2023 | ............ G10K 9/122 |
| JP | S62127195 | U | 8/1987 | |
| JP | S63255681 | A | 10/1988 | |
| JP | H08237796 | A | 9/1996 | |
| JP | 2005072771 | A | 3/2005 | |
| JP | 2017511009 | A | 4/2017 | |
| WO | 2012120354 | A1 | 9/2012 | |
| WO | 2015096959 | A1 | 7/2015 | |

OTHER PUBLICATIONS

The International Search Report and the Written Opinion of the International Searching Authority mailed on Jun. 14, 2023 for the PCT Application No. PCT/DE2023/2000059 which this application claims priority.

Japanese Patent Office, Office Action dated Jul. 30, 2025, from related Japanese Patent Application No. 2024-553699, 6 pages (with machine English translation).

Japanese Patent Office, Office Action dated Dec. 3, 2025, from related Japanese Patent Application No. 2024-553699, 4 pages (with machine English translation).

European Patent Office; Office Action dated Jun. 15, 2026, from related European Patent Application No. 23712801.2, 16 pages (with machine English translation).

* cited by examiner

ULTRASONIC SENSOR FOR A MOTOR VEHICLE

CROSS-REFERENCE TO RELATED APPLICATIONS

The present application is a National Stage Application under 35 U.S.C. § 371 of International Patent Application No. PCT/DE2023/200059 filed on Mar. 15, 2023, and claims priority from German Patent Application No. 10 2022 203 361.2 filed on Apr. 5, 2022, in the German Patent and Trademark Office, the disclosures of which are herein incorporated by reference in their entireties.

TECHNICAL FIELD

The invention relates to an ultrasonic sensor for a motor vehicle, having a sensor housing and having a pot-shaped membrane connected to the sensor housing, wherein the membrane has a membrane base for emitting and/or receiving ultrasonic signals and a membrane wall adjoining the membrane base, and wherein a section of the membrane wall protrudes into the sensor housing. In a housing interior of a housing section of the sensor housing facing the membrane base, a first sealing compound is arranged, which fills the housing interior.

BACKGROUND

Today's motor vehicles usually have a plurality of ultrasonic sensors which are assigned to driver assistance devices such as, for example, parking and/or brake assistance systems, and supply information regarding the surroundings of the motor vehicle, in particular regarding obstacles or objects in the surroundings and the distances thereof from the motor vehicle. The ultrasonic sensors are arranged and distributed over the motor vehicle, at least in the front and rear regions of the motor vehicle, and usually installed on trim parts, in particular on bumpers.

Such an ultrasonic sensor is regularly arranged in a corresponding opening or recess of the trim part of the motor vehicle in such a way that an end face-side or front-side membrane base of a pot-shaped membrane of the ultrasonic sensor terminates substantially flush with the outer surface of the trim part, wherein ultrasonic waves can be emitted and received via the membrane base during operation.

An ultrasonic sensor of the type indicated at the outset is, for example, known from DE 10 2006 028 214 A1. The ultrasonic sensor includes a substantially cylindrical sensor housing and a pot-shaped membrane mounted on the sensor housing which has a disk-shaped membrane base, wherein a piezo element is arranged on the inside of the membrane base, which can make the membrane base oscillate so that the latter can generate ultrasonic signals. The membrane is surrounded radially on the outside by an annular decoupling element which decouples the membrane in terms of oscillation from the sensor housing, and which is mounted on the housing side on an annular housing section of the sensor housing, which surrounds a part of the decoupling element facing the sensor housing radially on the outside, wherein the decoupling element and the housing section are connected to one another via latching means. In addition, a sealing compound is arranged in an interior of the sensor housing in order to protect the ultrasonic sensor and its electrical components against moisture and against dirt.

The disadvantage of such a configuration is the associated high number of individual parts and joining steps, which leads to complex production and high manufacturing costs overall.

SUMMARY

It is the object of the present disclosure to indicate an improved configuration for an ultrasonic sensor, the construction of which is simplified and which includes a number of individual parts and joining steps in the manufacturing process, which is as small as possible.

The aforementioned object is addressed by the teaching of claim 1. Expedient embodiments and further developments of the present disclosure are set out in the subclaims and the following description.

Accordingly, an ultrasonic sensor for a motor vehicle includes a sensor housing and a pot-shaped membrane connected to the sensor housing, wherein the membrane has a membrane base for emitting and/or receiving ultrasonic signals and a membrane wall adjoining the membrane base, wherein a section of the membrane wall protrudes into the sensor housing, and wherein in a housing interior of a housing section of the sensor housing facing the membrane base, a first sealing compound is arranged, which fills the housing interior.

According to the present disclosure, the first sealing compound extends at least partially into the membrane interior of the membrane surrounded by the membrane wall, wherein the membrane is connected with a positive fit to the sensor housing by the first sealing compound.

As a result, the membrane is already fastened by means of the first sealing compound to the sensor housing and fixed relative to the sensor housing. That is to say that, in addition to a sealing function and a mechanical decoupling between the membrane and the sensor housing, the first sealing compound assumes the generation of a corresponding positive fit.

Consequently, the configuration according to the present disclosure has the overall advantage that an improved configuration for an ultrasonic sensor is provided as a result, the construction and assembly of which are simplified.

In order to make it possible for the membrane wall to protrude into the sensor housing, an outer diameter of the membrane wall is smaller than an inner diameter of the sensor housing.

The membrane is advantageously configured in one piece with its membrane base and its membrane wall and may be formed from aluminum.

In an advantageous embodiment, a positive fit is produced at least in an axial direction and in a radial direction. That is to say that the positive fit is effected at least in the axial and radial directions.

In a further advantageous embodiment, an intermediate space is configured in the housing interior between the outside of the membrane wall protruding into the sensor housing and the inside of the housing wall of the housing section, wherein the first sealing compound extends at least partially into the intermediate space. The first sealing compound is consequently supported on the outside of the membrane wall and the inside of the housing wall. The first sealing compound advantageously extends completely into the intermediate space, so that the first sealing compound completely fills the intermediate space. As a result, a reliable positive fit is at least produced in the radial direction in the region.

In a further advantageous embodiment, a projection which extends radially outwards and runs, in particular completely around the axial end of the membrane wall like a ring collar is provided on the axial end of the membrane wall facing away from the membrane base. As a result, a particularly suitable positive connection is made possible. The projection preferably extends radially outwards perpendicularly to the membrane wall.

In a further advantageous embodiment, a groove corresponding to the projection of the membrane wall is provided in the first sealing compound, wherein the projection is arranged in the groove, as a result of which a positive fit is produced at least in the axial and radial directions. That is to say that, in this case, the first sealing compound has a groove corresponding to the circumferential projection and for receiving the projection, wherein the first sealing compound completely surrounds the projection in the assembled state.

In a further advantageous embodiment, an annular, elastic molded part is arranged in an axial section of the intermediate space facing the membrane base, wherein the projection rests on the molded part and produces a positive fit in the axial direction. That is to say that, in this case, the positive fit is produced by the first sealing compound together with the elastic molded part.

In a further advantageous embodiment, the first sealing compound extends in the housing interior in the radial direction up to the inside of the housing wall of the housing section, wherein the first sealing compound extends in the membrane interior in the radial direction up to the inner side of the membrane wall.

In a further advantageous embodiment, the first sealing compound extends in the membrane interior in the axial direction up to the inner side of the membrane base. Advantageously, the first sealing compound fills the membrane interior completely. In this case, in addition to generating a positive fit, the first sealing compound serves in particular to dampen oscillations on the membrane base and/or on the membrane wall.

In a further advantageous embodiment, the first sealing compound is configured in one piece from a first material. Advantageously, the first material is formed from an elastomer, thermoplastic, thermoset or silicone material.

In a further advantageous embodiment, the first sealing compound extends in the membrane interior in the axial direction merely along a section of the membrane wall facing away from the membrane base, wherein directly adjoining the first sealing compound a second sealing compound is arranged, which extends in the membrane interior in the axial direction from the first sealing compound up to the inner side of the membrane base and in the radial direction up to the inner side of the membrane wall. Advantageously, the first sealing compound is formed from a first material and the second sealing compound is formed from a second material which is different from the first material. In this case, the second sealing compound serves in particular to dampen oscillations on the membrane base and/or a section of the membrane wall facing the membrane base.

BRIEF DESCRIPTION OF THE DRAWINGS

Exemplary embodiments of the invention are explained in greater detail below with reference to a drawing, wherein.

DETAILED DESCRIPTION

Figure 1A:
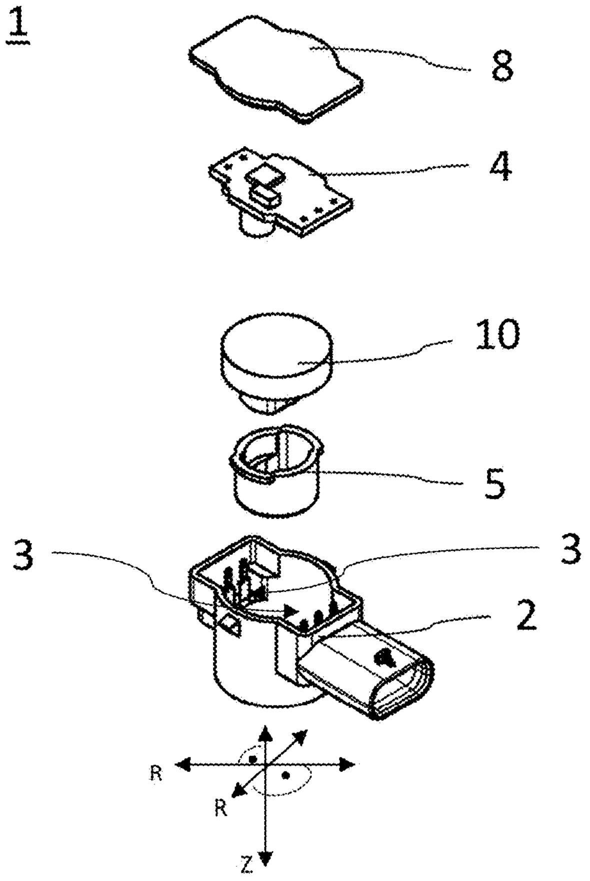
FIG. 1*a* shows an exploded representation of an ultrasonic sensor.

Corresponding parts are always provided with the same reference numerals in all of the figures.

Figure 1B:
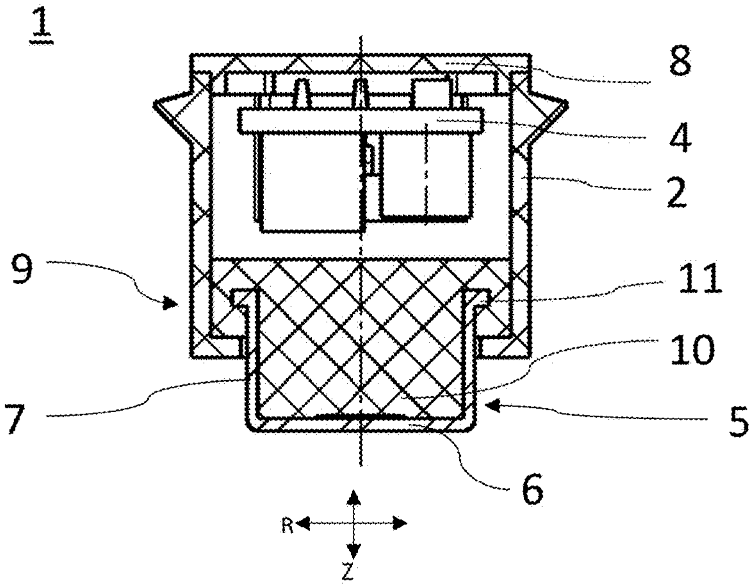
FIG. 1*b* shows a cross-section of the ultrasonic sensor according to FIG. 1*a*.

An exemplary embodiment of an ultrasonic sensor 1 is depicted in different views in FIGS. 1*a* and 1*b*. The ultrasonic sensor 1 is shown in an exploded representation in FIG. 1*a*, and in a cross-section in FIG. 1*b*.

The ultrasonic sensor 1 includes a one-piece sensor housing 2 with multiple electric contact pins 3 as well as a printed circuit board 4 arranged within the sensor housing 2 and connected to the contact pins 3. The ultrasonic sensor 1 further includes a pot-shaped membrane 5 connected to the sensor housing 2, wherein the membrane 5 has a membrane base 6 for emitting and/or receiving ultrasonic signals and has a membrane wall 7 adjoining the membrane base 6, and wherein a section of the membrane wall 7 protrudes into the sensor housing 2. On the inside of the membrane base 6, a disk-shaped piezo ceramic is arranged, which is electrically connected to the printed circuit board 4. On the axial end of the sensor housing 4 facing away from the membrane 5, the sensor housing 2 is closed by a lid 8.

In a housing interior of a housing section 9 of the sensor housing 2 facing the membrane base 6, a first sealing compound 10 is arranged, which fills the housing interior completely, wherein the first sealing compound 10 is configured in one piece from a first material, in particular from an elastomer, thermoplastic, thermoset or silicone material.

The first sealing compound 10 extends in the housing interior of the sensor housing 2 in the radial direction R up to the inner side of the housing wall of the housing section 9 of the sensor housing 2. The first sealing compound 10 also extends completely into an intermediate space configured between the outside of the membrane wall 7 protruding into the sensor housing 2 and the inside of the housing wall of the housing section 9.

In addition, the first sealing compound 10 extends into the membrane interior of the membrane 5 surrounded by the membrane wall 7, wherein the first sealing compound 10 extends in the radial direction R up to the inner side of the membrane wall 7 and in the axial direction Z up to the inner side of the membrane base 6. The first sealing compound 10 consequently completely fills the membrane interior and produces an oscillation damping on the membrane base 6 and the membrane wall 7.

Furthermore, on the axial end of the membrane wall 7 facing away from the membrane base 6, there is provided a projection 11 which extends perpendicularly to the membrane wall 7 and radially outwards and runs completely around the axial end of the membrane wall 7 like a ring collar, which projection engages in a groove corresponding to the projection 11 arranged in the first sealing compound 10, so that the first sealing compound 10 completely surrounds the projection 11.

A reliable positive fit in the axial direction Z and the radial direction R is produced by such a configuration and arrangement of the first sealing compound 10 as a whole in the sensor housing 2 and the membrane interior of the membrane 5, as well as the membrane 5, in particular with its projection 11, wherein the first sealing compound 10 consequently, in addition to a sealing function, an oscillation damping on the membrane base 6 and the membrane wall 7 and a mechanical decoupling between the membrane 5 and the sensor housing 2, also produces a corresponding positive fit and, therefore, a reliable fastening of the membrane 5 to the sensor housing 2.

Figure 2A:
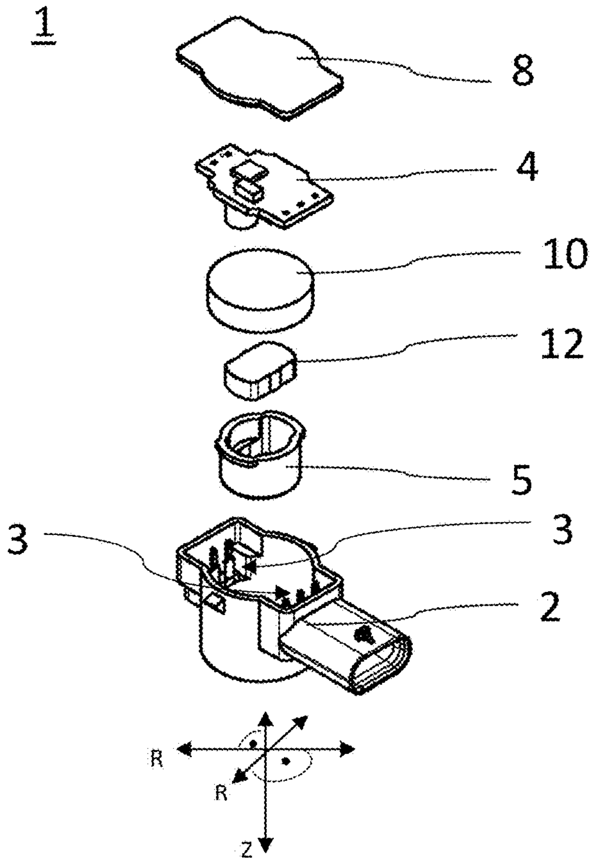
FIG. 2*a* shows an exploded representation of an ultrasonic sensor in an alternative embodiment.
Figure 2B:
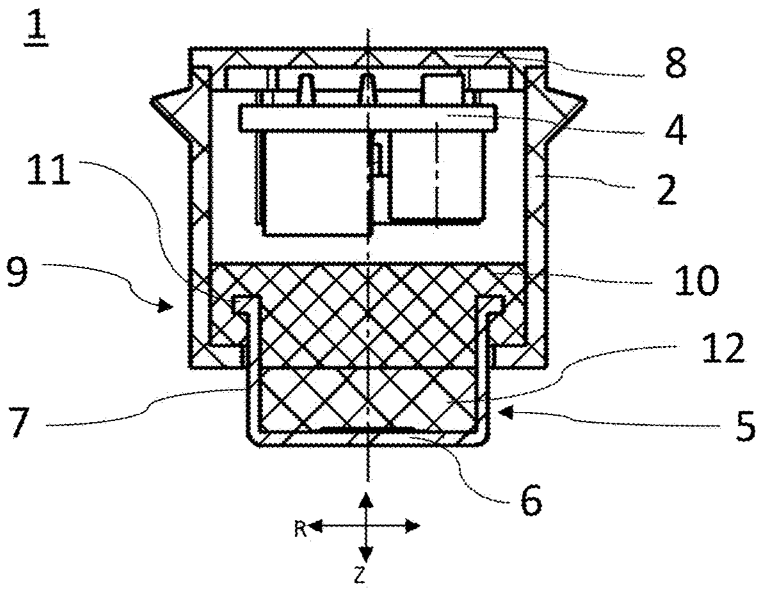
FIG. 2*b* shows a cross-section of the ultrasonic sensor according to FIG. 2*a*.

An ultrasonic sensor 1 is depicted in an alternative embodiment in different views in FIGS. 2*a* and 2*b*. The ultrasonic sensor 1 is shown in an exploded representation in FIG. 2*a*, and in a cross-section in FIG. 2*b*.

The ultrasonic sensor 1 substantially corresponds to the ultrasonic sensor 1 shown in FIGS. 1*a* to 1*b*, wherein, in addition to the first sealing compound 10, the ultrasonic sensor 1 has a second sealing compound 12 here.

The first sealing compound 10 extends in the membrane interior in the axial direction Z merely along a section of the membrane wall 7 facing away from the membrane base 6, wherein the second sealing compound 12 is arranged directly adjacent to the first sealing compound 10. The second sealing compound 12 extends in the membrane interior in the axial direction Z from the first sealing compound 10 up to the inside of the membrane base 6 and in the radial direction R up to the inside of the membrane wall 7. The second sealing compound 12 is formed from a second material which is different from the first material of the first sealing compound 10. In this case, the second sealing compound 12 serves in particular to dampen oscillations on the membrane base 6 and on the section of the membrane wall 7 facing the membrane base 6. In this case, a material which is particularly suitable for the corresponding oscillation damping can be used here as the second material.

Figure 3A:
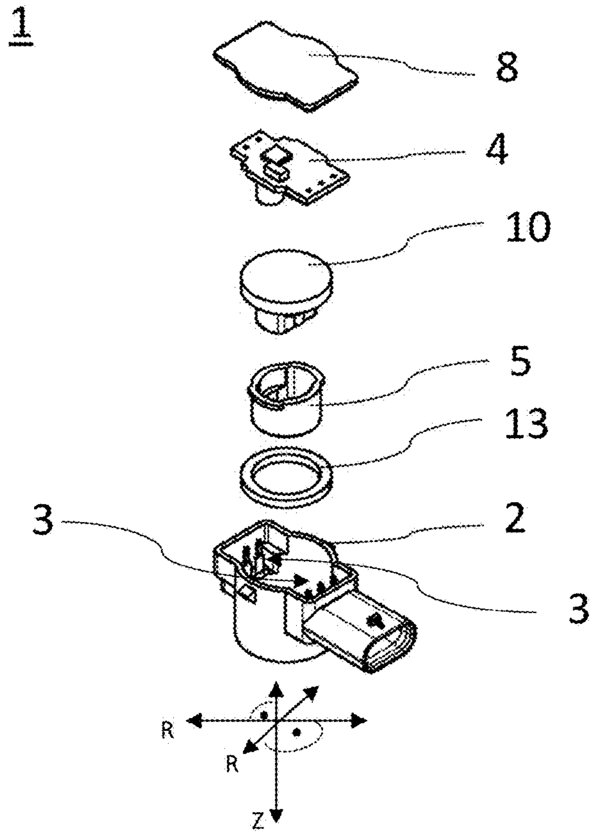
FIG. 3*a* shows an exploded representation of an ultrasonic sensor in a further alternative embodiment.
Figure 3B:
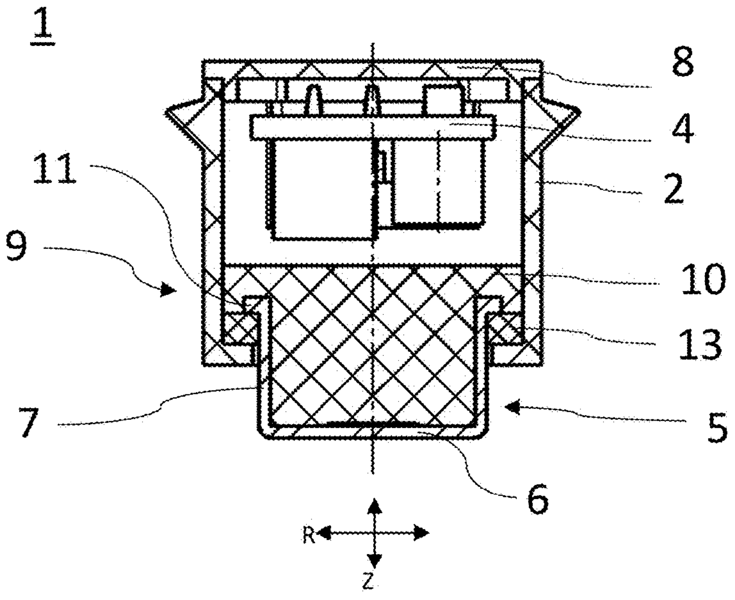
FIG. 3*b* shows a cross-section of the ultrasonic sensor according to FIG. 3*a*.

In FIGS. 3*a* and 3*b*, an ultrasonic sensor 1 is depicted in a further alternative embodiment in different views. The ultrasonic sensor 1 is shown in an exploded representation in FIG. 3*a*, and in a cross-section in FIG. 3*b*.

The ultrasonic sensor 1 substantially corresponds to the ultrasonic sensor 1 shown in FIGS. 1*a* to 1*b*, wherein, in addition to the first sealing compound 10, the ultrasonic sensor 1 has an annular, elastic molded part 13 here.

The elastic molded part 13 is arranged in an axial section of the intermediate space facing the membrane base 6 between the outside of the membrane wall 7 protruding into the sensor housing 2 and the inside of the housing wall of the housing section 9 of the sensor housing 2. The projection 11 configured on the membrane wall 7 rests on the molded part 13 and produces a positive fit in the axial direction Z. Consequently, the positive fit is produced here by the first sealing compound 10, together with the elastic molded part 13.

Figure 4A:
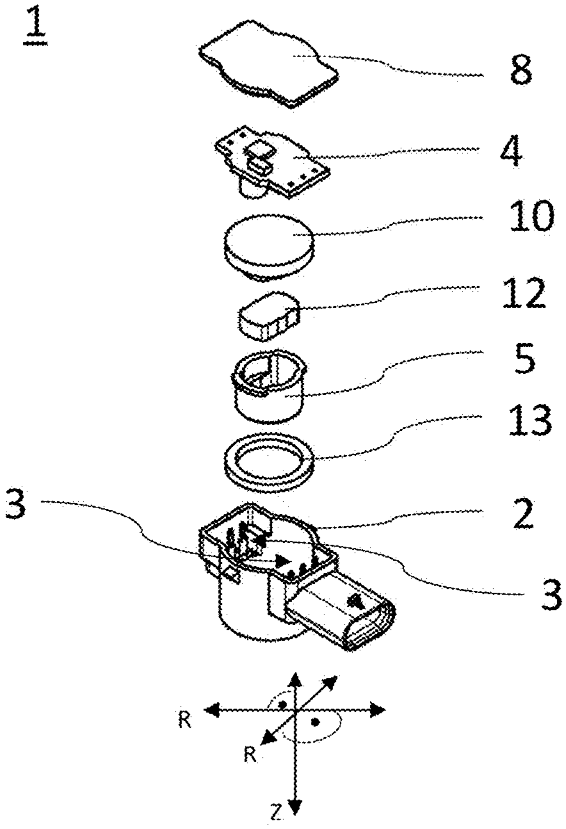
FIG. 4*a* shows an exploded representation of an ultrasonic sensor in a further alternative embodiment.
Figure 4B:
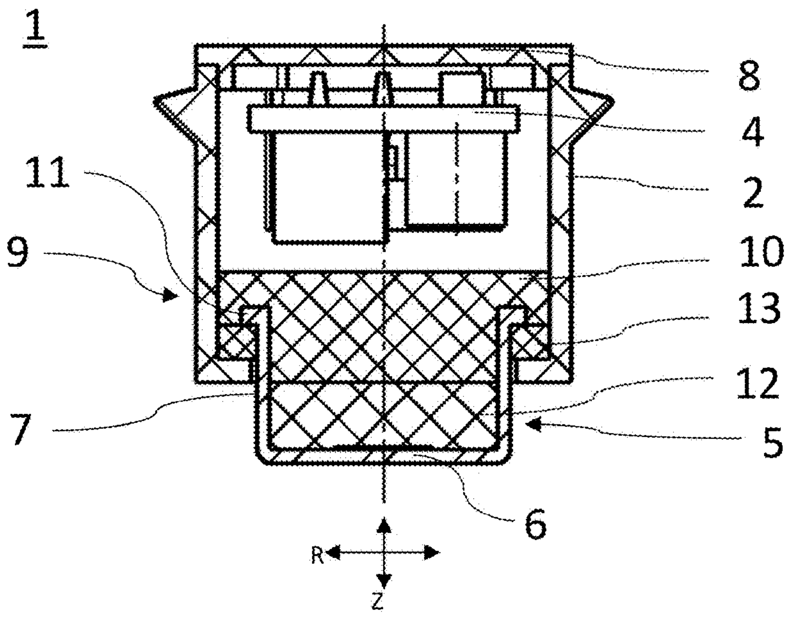
FIG. 4*b* shows a cross-section of the ultrasonic sensor according to FIG. 4*a*.

An ultrasonic sensor 1 is depicted in a further alternative embodiment in different views in FIGS. 4*a* and 4*b*. The ultrasonic sensor 1 is shown in an exploded representation in FIG. 4*a*, and in a cross-section in FIG. 4*b*.

The ultrasonic sensor 1 substantially corresponds to the ultrasonic sensor 1 shown in FIGS. 2*a* to 2*b*, wherein, in addition to the first sealing compound 10, the ultrasonic sensor 1 has an annular, elastic molded part 13 here.

The elastic molded part 13 is, in turn, arranged in an axial section of the intermediate space between the outside of the membrane wall 7 facing the membrane base 6 protruding into the sensor housing 2 and the inside of the housing wall of the housing section 9 of the sensor housing 2, wherein the projection 11 configured on the membrane wall 7 rests on the molded part 13, as a result of which a positive fit is produced in the axial direction Z. Consequently, a positive fit is in particular produced here by the first sealing compound 10 together with the elastic molded part 13.

Figure 5A:
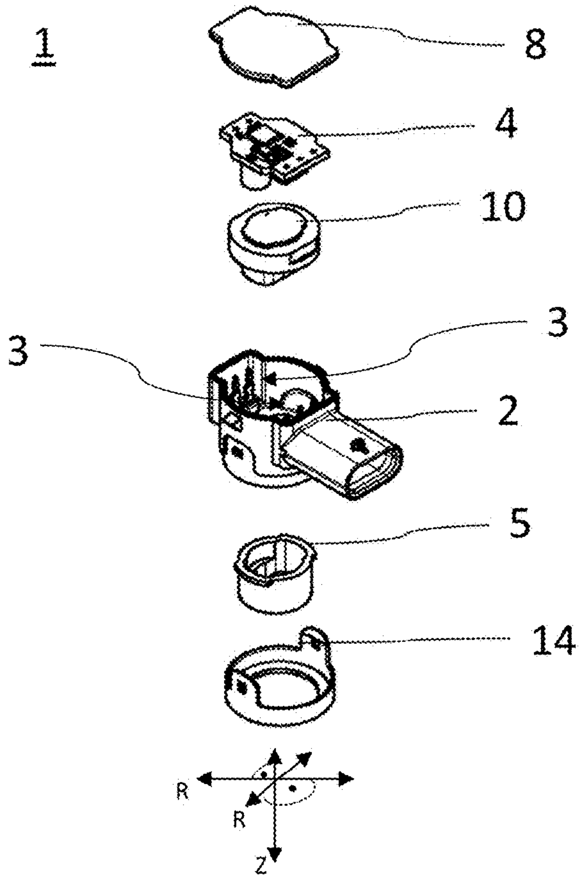
FIG. 5*a* shows an exploded representation of an ultrasonic sensor in a further alternative embodiment.
Figure 5B:
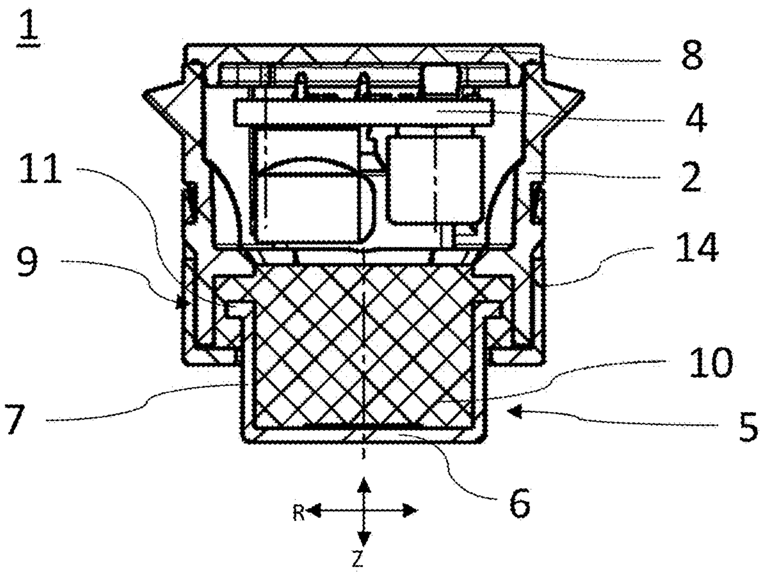
FIG. 5*b* shows a cross-section of the ultrasonic sensor according to FIG. 5*a*.

An ultrasonic sensor 1 is depicted in a further alternative embodiment in different views in FIGS. 5*a* and 5*b*. The ultrasonic sensor 1 is shown in an exploded representation in FIG. 5*a*, and in a cross-section in FIG. 5*b*.

The ultrasonic sensor 1 substantially corresponds to the ultrasonic sensor 1 shown in FIGS. 1*a* to 1*b*, wherein the sensor housing 2 here is configured to be hollow cylindrical in the axial end section facing the membrane base 6, and wherein a front cap 14 is connected to the sensor housing 2 via a latching connection at the axial end section.

It is understood to a person skilled in the art that a configuration of this type having such a sensor housing 2 and such a front cap 14 can also be correspondingly applied to the embodiments of FIGS. 2*a* to 4*b*.

LIST OF REFERENCE NUMERALS

1 Ultrasonic sensor
2 Sensor housing
3 Contact pin
4 Printed circuit board
5 Membrane
6 Membrane base
7 Membrane wall
8 Lid
9 Housing section of the sensor housing
10 First sealing compound
11 Projection
12 Second sealing compound
13 Molded part
14 Front cap
R Radial direction
Z Axial direction

The invention claimed is:

1. An ultrasonic sensor for a motor vehicle, comprising a sensor housing and having a pot-shaped membrane connected to the sensor housing, the membrane having a membrane base for at least one of emitting or receiving ultrasonic signals and a membrane wall adjoining the membrane base, wherein a section of the membrane wall protrudes into the sensor housing, wherein in a housing interior of a housing section of the sensor housing facing the membrane base, a first sealing compound is arranged, the first sealing compound fills the housing interior, wherein the first sealing compound extends at least partially into a membrane interior of the membrane surrounded by the membrane wall, and the membrane is connected to the sensor housing by the first sealing compound in a positive-fit connection that restrains movement of the membrane relative to the sensor housing in both an axial direction and a radial direction.

2. The ultrasonic sensor according to claim 1, wherein an intermediate space is configured in the housing interior between an outside of the membrane wall protruding into the sensor housing and an inside of the housing wall of the housing section, and the first sealing compound extends at least partially into the intermediate space.

3. The ultrasonic sensor according to claim 1, wherein a projection, which extends radially outward and runs-extends in an annular manner around an axial end of the membrane wall, is provided on the axial end of the membrane wall facing away from the membrane base.

4. The ultrasonic sensor according to claim 3, wherein a groove corresponding to the projection of the membrane wall is provided in the first sealing compound, and the projection is arranged in the groove, as a result of which a positive fit is produced at least in the axial and radial directions.

5. The ultrasonic sensor according to claim 3, wherein an intermediate space is configured in the housing interior between an outside of the membrane wall protruding into the sensor housing and an inside of the housing wall of the housing section, and the first sealing compound extends at least partially into the intermediate space, and wherein an annular, elastic molded part is arranged in an axial section of the intermediate space facing the membrane base, and in that the projection rests on the molded part and produces a positive fit in the axial direction.

6. The ultrasonic sensor according to claim 1, wherein the first sealing compound extends in the housing interior in the radial direction up to an inner side of the housing wall of the housing section, and the first sealing compound extends in the membrane interior in the radial direction up to an inner side of the membrane wall.

7. The ultrasonic sensor according to claim 1, wherein the first sealing compound extends in the membrane interior in the axial direction up to an inner side of the membrane base.

8. The ultrasonic sensor according to claim 1, wherein the first sealing compound is configured in one piece from a first material.

9. The ultrasonic sensor according to claim 1, wherein the first sealing compound extends in the membrane interior in the axial direction along a section of the membrane wall facing away from the membrane base, and directly adjoining the first sealing compound a second sealing compound is arranged, the second sealing compound which extending in the membrane interior in the axial direction from the first sealing compound up to an inner side of the membrane base and in the radial direction up to the inner side of the membrane wall.

* * * * *